United States Patent
Connell, II et al.

(10) Patent No.: US 10,778,672 B2
(45) Date of Patent: Sep. 15, 2020

(54) SECURE BIOMETRICS MATCHING WITH SPLIT PHASE CLIENT-SERVER MATCHING PROTOCOL

(71) Applicant: International Business Machines Corporation, Armonk, NY (US)

(72) Inventors: Jonathan H. Connell, II, Cortlandt-Manor, NY (US); Jae-Eun Park, Wappingers Falls, NY (US); Nalini K. Ratha, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 361 days.

(21) Appl. No.: 14/942,931

(22) Filed: Nov. 16, 2015

(65) Prior Publication Data

US 2017/0142101 A1    May 18, 2017

(51) Int. Cl.
*H04L 29/06*    (2006.01)
*G06F 21/32*    (2013.01)

(52) U.S. Cl.
CPC .......... *H04L 63/0861* (2013.01); *G06F 21/32* (2013.01)

(58) Field of Classification Search
CPC ..... H04L 63/0861; H04L 63/20; H04L 63/10; H04L 67/02; H04L 67/306; G06F 21/31
See application file for complete search history.

(56) References Cited

U.S. PATENT DOCUMENTS

| | | | |
|---|---|---|---|
| 6,018,739 A | 1/2000 | McCoy et al. | |
| 8,266,676 B2 | 9/2012 | Hardjono et al. | |
| 8,281,373 B2 | 10/2012 | Fujii et al. | |
| 8,959,586 B2 | 2/2015 | Pizano et al. | |
| 9,378,477 B2* | 6/2016 | Ross | G06Q 10/06393 |
| 2004/0019570 A1 | 1/2004 | Bolle et al. | |
| 2006/0143453 A1 | 6/2006 | Imamoto et al. | |
| 2008/0104676 A1 | 5/2008 | Ikegami | |
| 2008/0172725 A1* | 7/2008 | Fujii | G06F 21/32 726/5 |
| 2008/0244756 A1* | 10/2008 | Kitada | G06F 21/31 726/28 |
| 2009/0157802 A1* | 6/2009 | Kang | G06F 17/30581 709/203 |

(Continued)

OTHER PUBLICATIONS

U.S. Appl. No. 62/111,897 Specification, filed Feb. 2015.*

(Continued)

*Primary Examiner* — Tongoc Tran
(74) *Attorney, Agent, or Firm* — Reza Sarbakhsh

(57) ABSTRACT

An embodiment of the invention provides a method for secure biometrics matching with split phase client-server matching protocol, wherein a first biometric input is received in an electronic device. The first biometric input is stored in the electronic device as a biometric profile; and, the biometric profile is sent to a server. An additional biometric input is received from a user in the electronic device; and, the additional biometric input is compared to the biometric profile stored in the electronic device to generate a local matching score. The additional biometric input is sent to the server. The local matching score and a remote matching score generated by the at least one server are compared; and, it is determined whether to authenticate the user based on the comparison of the local matching score and the remote matching score.

15 Claims, 7 Drawing Sheets

(56) References Cited

U.S. PATENT DOCUMENTS

| | | | | |
|---|---|---|---|---|
| 2009/0289760 | A1* | 11/2009 | Murakami | G06K 9/00885 340/5.82 |
| 2010/0097179 | A1* | 4/2010 | Hayashida | G06F 21/32 340/5.82 |
| 2012/0084333 | A1* | 4/2012 | Huang | H04L 29/0854 707/827 |
| 2012/0159600 | A1* | 6/2012 | Takagi | G06F 21/32 726/7 |
| 2012/0291111 | A1* | 11/2012 | Kamakura | G06F 21/32 726/7 |
| 2013/0239191 | A1 | 9/2013 | Bostick | |
| 2014/0090042 | A1* | 3/2014 | Short, III | H04L 61/1511 726/7 |
| 2014/0330729 | A1* | 11/2014 | Colangelo | G06Q 20/40145 705/72 |
| 2014/0337614 | A1* | 11/2014 | Kelson | H04L 63/168 713/152 |
| 2015/0007295 | A1 | 1/2015 | Hou et al. | |
| 2016/0055236 | A1* | 2/2016 | Frank | G06Q 30/02 707/748 |
| 2016/0087855 | A1* | 3/2016 | Vlachogiannis | H04L 67/40 709/223 |
| 2016/0165010 | A1* | 6/2016 | Bacovsky | H04L 67/42 709/203 |
| 2016/0189149 | A1* | 6/2016 | MacLaurin | G06Q 20/40145 705/44 |
| 2016/0224855 | A1* | 8/2016 | Al-Hamad | G01C 11/04 |
| 2016/0344561 | A1* | 11/2016 | Grajek | H04L 9/3268 |
| 2018/0121724 | A1* | 5/2018 | Ovsiannikov | G06K 9/00617 |

OTHER PUBLICATIONS

Bing, H. E., Zheng-Ding, Q., & Dong-Mei, S. (Oct. 2002). Secure authentication system incorporating hand shapes verification and cryptography techniques. In TENCON'02. Proceedings. 2002 IEEE Region 10 Conference on Computers, Communications, Control and Power Engineering (vol. 1, pp. 156-159). IEEE.

* cited by examiner

SECURE BIOMETRICS MATCHING WITH SPLIT PHASE CLIENT-SERVER MATCHING PROTOCOL

BACKGROUND

The present invention relates to systems, methods, and computer program products for secure biometrics matching with split phase client-server matching protocol.

A biometric is a physical or behavioral characteristics of a person that can be used to determine or authenticate a person's identity. Biometrics such as fingerprint impressions have been used in law enforcement agencies for decades to identify criminals. More recently, other biometrics such as face, iris and signature are starting to be used to identify persons in many types of transactions, e.g., check cashing and ATM use. An automated biometrics identification system analyzes a biometrics signal using pattern recognition techniques and arrives at a decision whether the query biometrics signal is already present in the database. An authentication system tests whether the query biometrics is equal, or similar, to the stored biometrics associated with the claimed identity. A generic automated biometrics system has three stages: (i) signal acquisition; (ii) signal representation and (iii) pattern matching.

SUMMARY OF THE INVENTION

An embodiment of the invention provides a method for secure biometrics matching with split phase client-server matching protocol, wherein a first biometric input is received in an electronic device. The first biometric input is stored in the electronic device as a biometric profile; and, the biometric profile is sent to a server. An additional biometric input is received from a user in the electronic device; and, the additional biometric input is compared to the biometric profile stored in the electronic device to generate a local matching score. The additional biometric input is sent to the server. The local matching score and a remote matching score generated by the at least one server are compared; and, it is determined whether to authenticate the user based on the comparison of the local matching score and the remote matching score.

In another embodiment, a biometric profile of a user is received by a server. A biometric input from the user is received by the server, the biometric input being obtained and sent to the server from an electronic device. The biometric input is compared to the biometric profile stored in the server with a processor to generate a matching score. The matching score and a matching score generated by the electronic device are compared; and, it is determined whether to authenticate the user based on the comparing of the matching score and the matching score generated by the electronic device.

BRIEF DESCRIPTION OF THE SEVERAL VIEWS OF THE DRAWINGS

The present invention is described with reference to the accompanying drawings. In the drawings, like reference numbers indicate identical or functionally similar elements.

DETAILED DESCRIPTION

Figure 1:
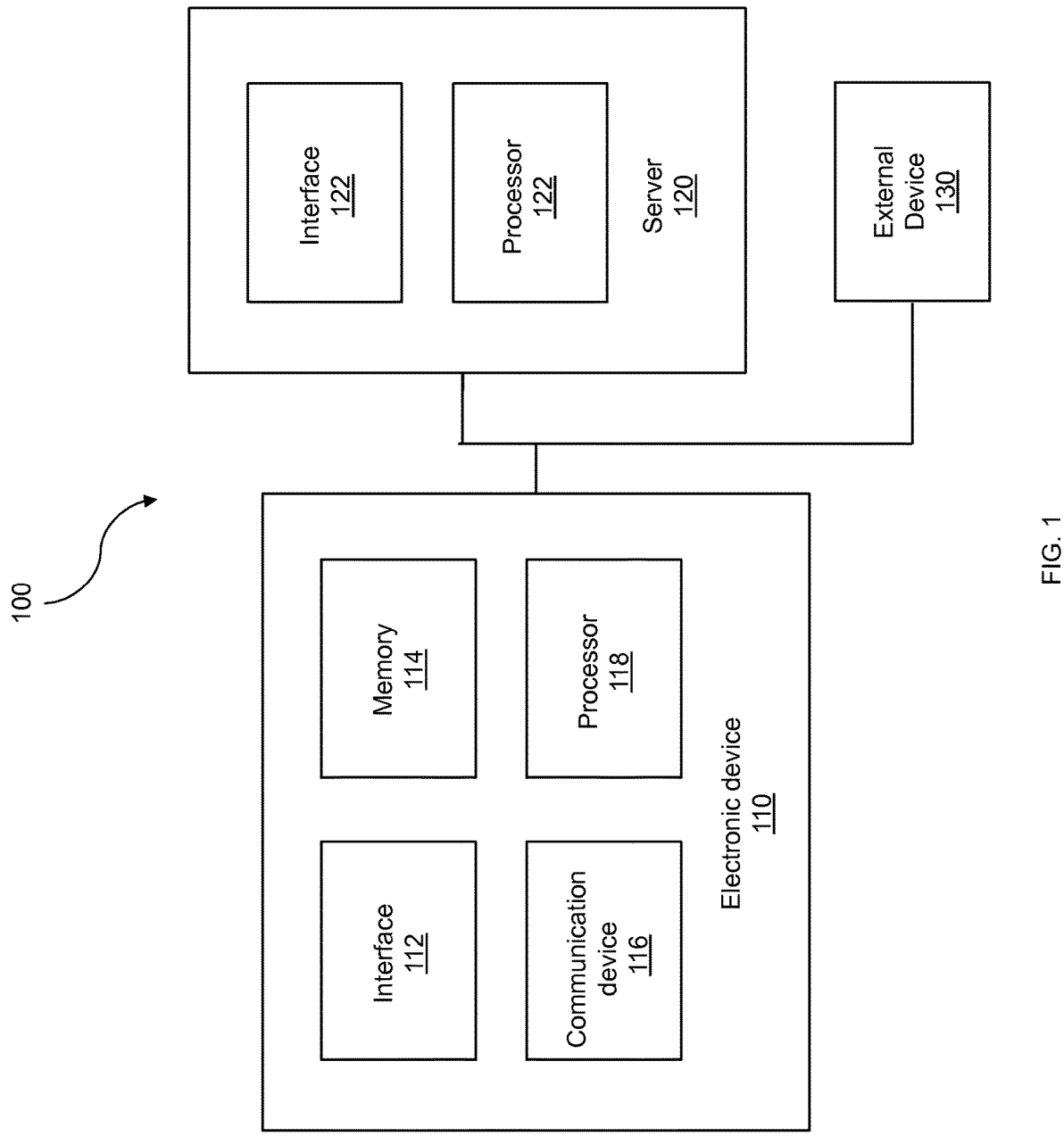
FIG. 1 is a diagram illustrating a system for secure biometrics matching with split phase client-server matching protocol according to an embodiment of the invention.

Exemplary, non-limiting, embodiments of the present invention are discussed in detail below. While specific configurations are discussed to provide a clear understanding, it should be understood that the disclosed configurations are provided for illustration purposes only. A person of ordinary skill in the art will recognize that other configurations may be used without departing from the spirit and scope of the invention.

At least one embodiment of the invention provides a biometrics based authentication system that uses a forward path to transfer a biometrics image/template to upload the data to the server. The server can then match the query template against the desired database template. The system checks the health of both the client device and the server by sending carefully chosen templates from the client device to the server, and vice-versa, before the final decision is made.

The system can perform the authentication at both the client device and the server and then compare the results. For example, if the client device passes the user but the server rejects the user, it is possible that the client device has been compromised. Conversely, if multiple client devices reject users while the server passes them, suspicion falls on the server code and its database instead.

In at least one embodiment of the invention, a client device acquires a biometric signal from a user and matches the acquired biometric signal against a local copy of the enrolled template (stored on the client device). The client device can upload the matching score and biometric signal to the server; and, the server can send a set of pre-chosen templates to the client device. The client device can match the query (i.e., biometric signal) against the set of pre-chosen templates as well as the enrolled template (i.e., the template obtained when the user enrolled). In at least one embodiment, the client device transfers all of the matching scores to the server, and the server reviews all of the matching scores to make a final decision after judging the health of the client device and its own health from the trends in the matching scores it received from the client device and its own matching scores.

At least one embodiment of the invention provides a method for assuring the integrity of a biometric authentication system, including an enrollment step where one or more samples of a biometric signal of a user are acquired by a client device and converted to a biometric template that is stored both locally on the client device and on a remote server.

A local matching step can be performed where a query biometric signal of a user is acquired by the client device and matched to the local template to produce a local match score. In addition, a remote matching step is performed where the remote server matches the query biometric against the enrolled template to produce a remote match score. A coordinating step can be performed where the local match score and the remote match scores are compared in order to authenticate the user and to assess the integrity of both the client device and the server.

A secondary health check step can be performed where an alternative template is presented to both the client device and the server. Both the client device and the server can match the alternative template against the query biometric signal to produce a second local match score and second remote match score, respectively. The coordinating step can also compare this second set of match scores in order to authenticate and to assess the user's credentials.

Figure 2:
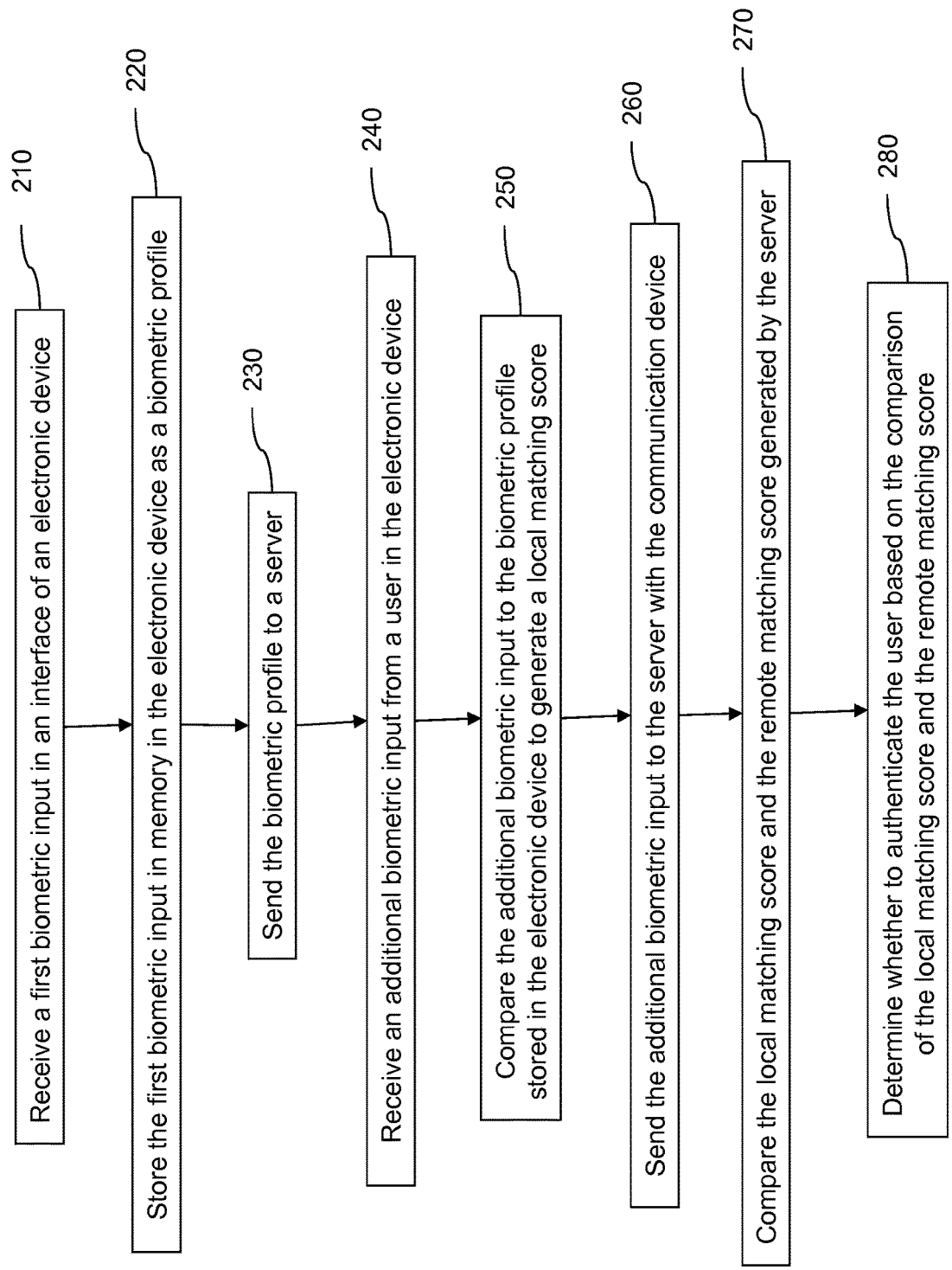
FIG. 2 is a flow diagram illustrating a method for secure biometrics matching with split phase client-server matching protocol according to an embodiment of the invention.

FIG. 1 is a diagram illustrating a system 100 for secure biometrics matching with split phase client-server matching protocol according to an embodiment of the invention. FIG. 2 is a flow diagram illustrating a method for secure biometrics matching with split phase client-server matching protocol (e.g., using the system 100) according to an embodiment of the invention. A first biometric input can be received in an interface 112 of an electronic device 110 (210). For example, the first biometric input can be received in a fingerprint scanner 112 or an iris scanner 112 of the electronic device 110. The electronic device can have any number or types of interface devices (e.g., camera, keyboard, mouse, touch screen, motion sensor, etc.) Moreover, the electronic device can be a workstation, tablet computer, smartphone, etc. The first biometric input can be stored in memory 114 in the electronic device 110 as a biometric profile (220). A communication device 116 in the electronic device 110 can sending the biometric profile to at least one server 120 (230).

An additional biometric input can be received from a user in the electronic device (240). For example, the additional biometric input can be received in the fingerprint scanner 112 or the iris scanner 112 of the electronic device 110. A processor 118 in the electronic device 110 can compare the additional biometric input to the biometric profile stored in the electronic device to generate a local matching score (250). For example, the processor can compare a set of reference points on the additional biometric input (fingerprint) to a set of reference points on the stored biometric profile (fingerprint), determine that there is a 100% match, and generate a matching score of 100. The additional biometric input can be sent to the server with the communication device 116 (260).

The additional biometric input can be compared to the biometric profile stored in the server to generate a remote matching score. In at least one embodiment, the additional biometric input is compared to all of the biometric profiles stored in the server, wherein the highest matching score obtained is used as the remote matching score. In another embodiment, the electronic device notifies the device performing the comparison step (e.g., the server 110, the electronic device 120, and/or a third external device 130) which biometric profile to compare the additional biometric input to. In yet another embodiment, the device performing the comparison step identifies the electronic device that sent the additional biometric input, and compares the additional biometric input to the biometric profile of the registered user of the electronic device.

In at least one embodiment, the system 100 (e.g., a processor in the electronic device 110, the server 120, and/or the third external device 130) compares the local matching score and the remote matching score generated by the server (270) and determines whether to authenticate the user based on the comparison of the local matching score and the remote matching score (280). The user can be authenticated when the local matching score matches the remote matching score; and, the user can be denied when the local matching score does not match the remote matching score. While the description is around matching scores, it can also mean mis-match scores, probability of matching two biometrics samples. Scores can differ marginally due to different environment on the client device and the remote server. The difference can also come due to version misalignment. The drift in the score can be used to detect version misalignment and help the user upgrade.

In at least one embodiment, the local matching score is compared to the remote matching score to generate a third matching score, where the user is authenticated when the third matching score is above a threshold, and where the user is denied when the third matching score is below the threshold. For example, a local matching score of 98 is compared to a remote matching score of 99 to generate a third matching score of 99 (i.e., 100−(99−98)). If the threshold is 98, then the user is authenticated. In another example, a local matching score of 34 is compared to a remote matching score of 97 to generate a third matching score of 37 (i.e., 100−(97−34)). In this example, the user is denied access. The comparison and the generation of the third matching score can be performed in the electronic device 110, the server 120, and/or the third external device 130.

The system 100 (e.g., a processor in the electronic device 110, the server 120, and/or the third external device 130) can determine whether the integrity of the electronic device 110 is compromised and/or whether the integrity of the server 120 is compromised based on the comparison of the local matching score and the remote matching score. For example, the system 100 can determine that the integrity of the electronic device 110 is not compromised when the local matching score matches the remote matching score. In another example, the system 100 can determine that the integrity of the electronic device 110 is compromised when the local matching score does not match the remote matching score. In yet another example, the system 100 can determine that the integrity of the server 120 is not compromised when the local matching score matches the remote matching score. In still yet another example, the system 100 can determine that the integrity of the server 120 is compromised when the local matching score does not match the remote matching score.

Figure 3:
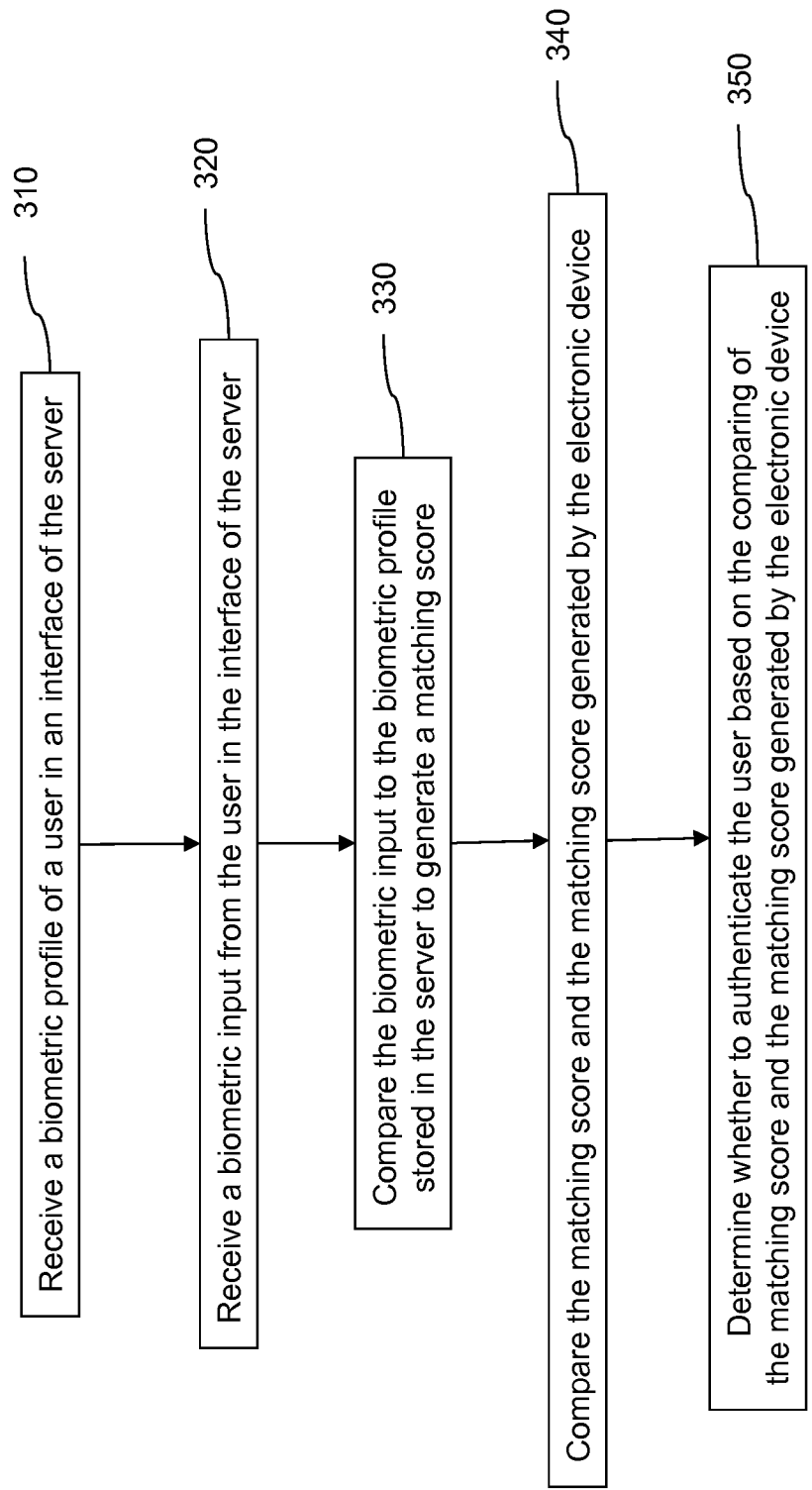
FIG. 3 is a flow diagram illustrating a method for secure biometrics matching with split phase client-server matching protocol according to another embodiment of the invention.

FIG. 3 is a flow diagram illustrating a method for secure biometrics matching with split phase client-server matching protocol (e.g., using the system 100) according to another embodiment of the invention.

A biometric profile of a user can be received in an interface 122 (e.g., input port) of the server 120 (310). A biometric input from the user can also be received in the interface 122 of the server 120 (320), the biometric input being obtained and sent to the server 120 from the electronic device 110.

A processor 124 in the server 120 can compare the biometric input to the biometric profile stored in the server 120 to generate a matching score (330). Although not illustrated in FIG. 1, the server 120 can have a communications device and memory. In at least one embodiment, the biometric input is compared to all of the biometric profiles stored in the server, wherein the highest matching score obtained is used as the matching score. In another embodiment, the electronic device notifies the device performing the comparison step (e.g., the server 110, the electronic device 120, and/or a third external device 130) which biometric profile to compare the biometric input to. In yet another embodiment, the device performing the comparison step identifies the electronic device that sent the biometric input, and compares the biometric input to the biometric profile of the registered user of the electronic device that sent the biometric input.

In at least one embodiment, the system 100 (e.g., a processor in the electronic device 110, the server 120, and/or the third external device 130) compares the matching score and the matching score generated by the electronic device 110 (340) and determines whether to authenticate the user based on the comparing of the matching score and the matching score generated by the electronic device (350). The user can be authenticated when the matching score matches the matching score generated by the electronic device 110; and, the user can be denied when the matching score does not match the matching score generated by the electronic device 110.

In another embodiment, the matching score is compared to the matching score generated by the electronic device 110 to generate a third matching score, where the user is authenticated when the third matching score is above a threshold, and wherein the user is denied when the third matching score is below the threshold. For example, a matching score of 11 is compared to a matching score generated by the electronic device 110 of 9 to generate a third matching score of 98 (i.e., 100−(11−9)). If the threshold is 97, then the user is authenticated. In another example, a matching score of 99 is compared to a matching score generated by the electronic device 110 of 93 to generate a third matching score of 94 (i.e., 100−(99−93)). In this example, the user is denied access (threshold of 97).

In another embodiment, the server chooses one or more templates to challenge the client device to compute the match scores against the query biometric. The client device can return the scores of the performed matches to the server. The server can compute the match scores against the referenced template and the selected templates. The collection of scores can examined to assess the health of the client device.

The system 100 (e.g., a processor in the electronic device 110, the server 120, and/or the third external device 130) can determine whether the integrity of the electronic device 110 is compromised and/or whether the integrity of the server 120 is compromised based on the comparing of the matching score and the matching score generated by the electronic device 110. For example, the system 100 can determine that the integrity of the electronic device 110 is not compromised when the matching score matches the matching score generated by the electronic device 110. In another example, the system 100 can determine that the integrity of the electronic device 110 is compromised when the matching score does not match the matching score generated by the electronic device 110. In yet another example, the system 100 can determine that the integrity of the server 120 is not compromised when the matching score matches the matching score generated by the electronic device 110. In still another example, the system 100 can determine that the integrity of the server 120 is compromised when the matching score does not match the matching score generated by the electronic device 110. In still yet another example, the system 100 can determine that the integrity of the server 120 is compromised when a threshold number of matching scores generated by electronic devices fail to match the matching score.

The system 100 (e.g., a processor in the electronic device 110, the server 120, and/or the third external device 130) can compare the matching score generated by the electronic device 110 (e.g., 99) to a matching score of a second user (e.g., 99), where the matching score of the second user is different from the matching score generated by the server 120 for the user (e.g., 71). In other words, because the second user is a different person, and thus has different biometrics than the user, the matching score of the second user should be different from the matching score of the user. The system 100 (e.g., a processor in the electronic device 110, the server 120, and/or the third external device 130) can determine that the electronic device 110 is compromised when the matching score generated by the electronic device 110 (e.g., 99) is within a threshold degree if similarity (e.g., 2) with the matching score of the second user (e.g., 99).

It may be deemed that the electronic device 110 is compromised because the matching scores are for two different people, and should not be the same. For example, John's phone receives the user's biometric input and produces a matching score of 99; and, the user's biometric input is also compared to the biometric profile of Jill (i.e., the second user). If the user's biometric input matches the biometric profile of Jill, then John's phone may be compromised.

The system 100 (e.g., a processor in the electronic device 110, the server 120, and/or the third external device 130) can compare the matching score generated by the server 120 (e.g., 100) to a matching score of a second user (e.g., 99), wherein the matching score of the second user is different from the matching score generated by the electronic device 110 (e.g., 8).

The system 100 (e.g., a processor in the electronic device 110, the server 120, and/or the third external device 130) can determine that the server 120 is compromised when the matching score generated by the server 120 is within a threshold degree if similarity (e.g., 3) with the matching score of the second user.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 4:
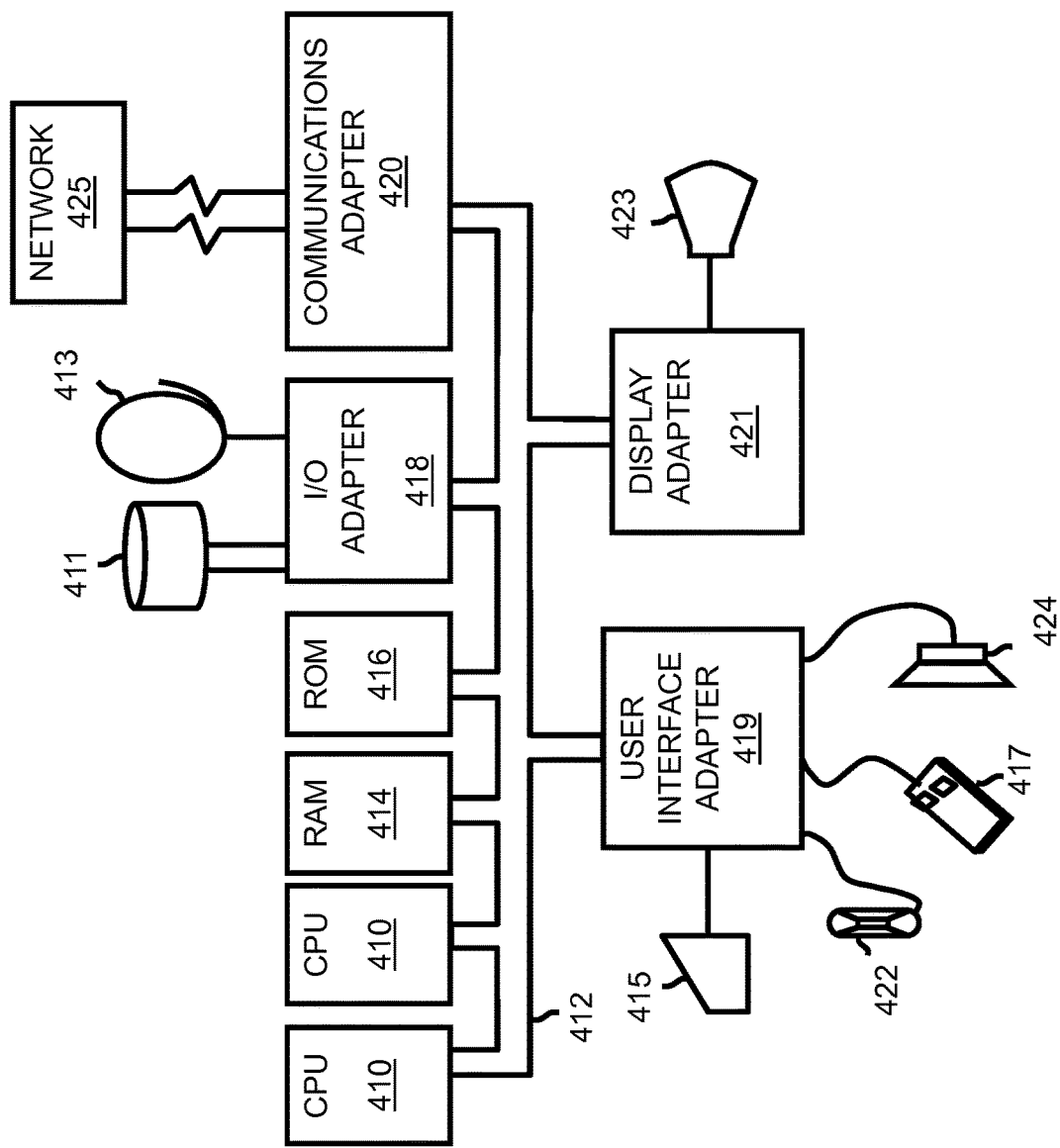
FIG. 4 is a diagram illustrating a computer program product according to an embodiment of the invention.

Referring now to FIG. 4, a representative hardware environment for practicing at least one embodiment of the invention is depicted. This schematic drawing illustrates a hardware configuration of an information handling/computer system in accordance with at least one embodiment of the invention. The system comprises at least one processor or central processing unit (CPU) 410. The CPUs 410 are interconnected with system bus 412 to various devices such as a random access memory (RAM) 414, read-only memory (ROM) 416, and an input/output (I/O) adapter 418. The I/O adapter 418 can connect to peripheral devices, such as disk units 411 and tape drives 413, or other program storage devices that are readable by the system. The system can read the inventive instructions on the program storage devices and follow these instructions to execute the methodology of at least one embodiment of the invention. The system further includes a user interface adapter 419 that connects a keyboard 415, mouse 417, speaker 424, microphone 422, and/or other user interface devices such as a touch screen device (not shown) to the bus 412 to gather user input. Additionally, a communication adapter 420 connects the bus 412 to a data processing network 425, and a display adapter 421 connects the bus 412 to a display device 423 which may be embodied as an output device such as a monitor, printer, or transmitter, for example.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.'

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
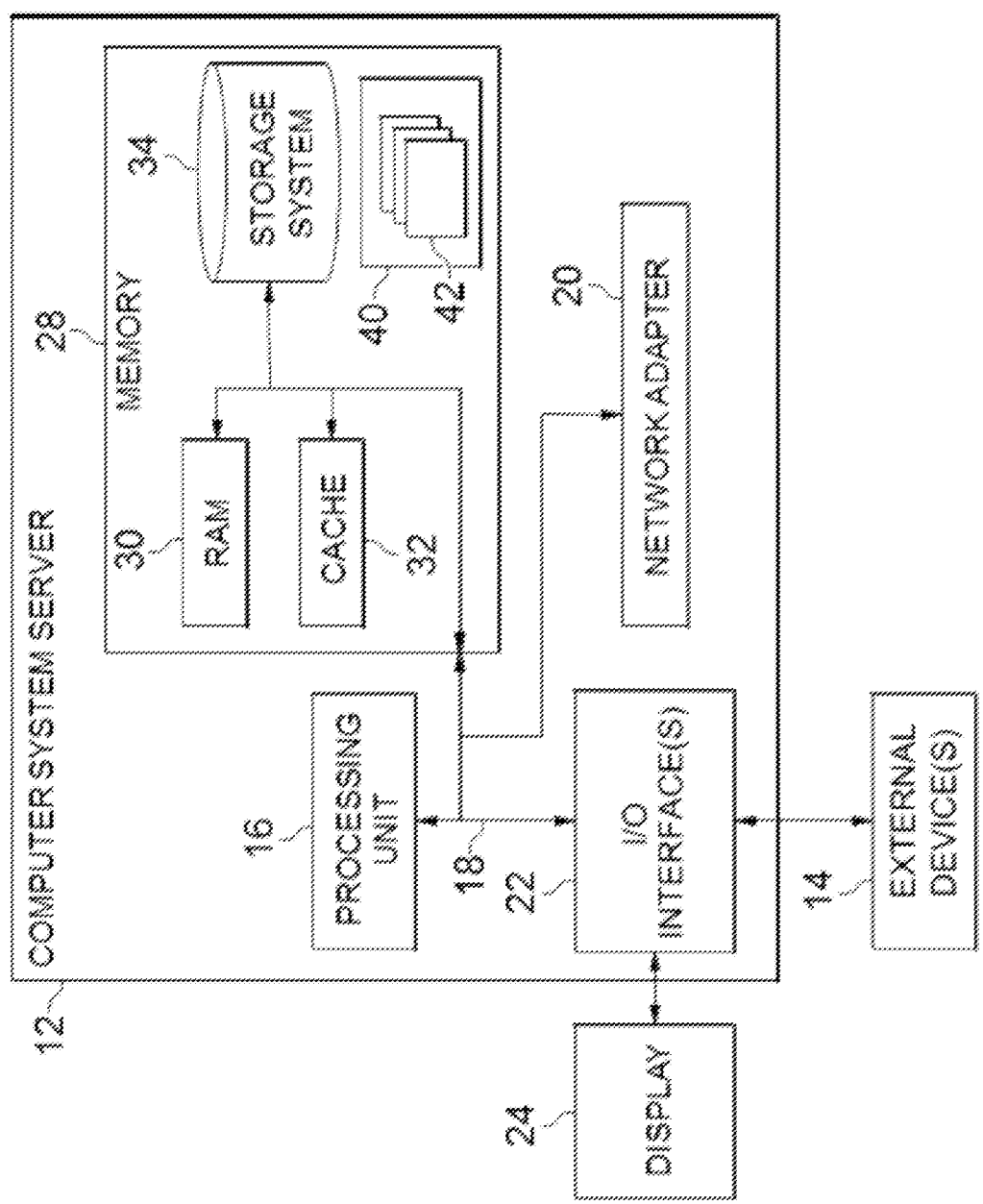
FIG. 5 depicts a cloud computing node according to an embodiment of the present invention.

Referring now to FIG. 5, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer systemexecutable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 6:
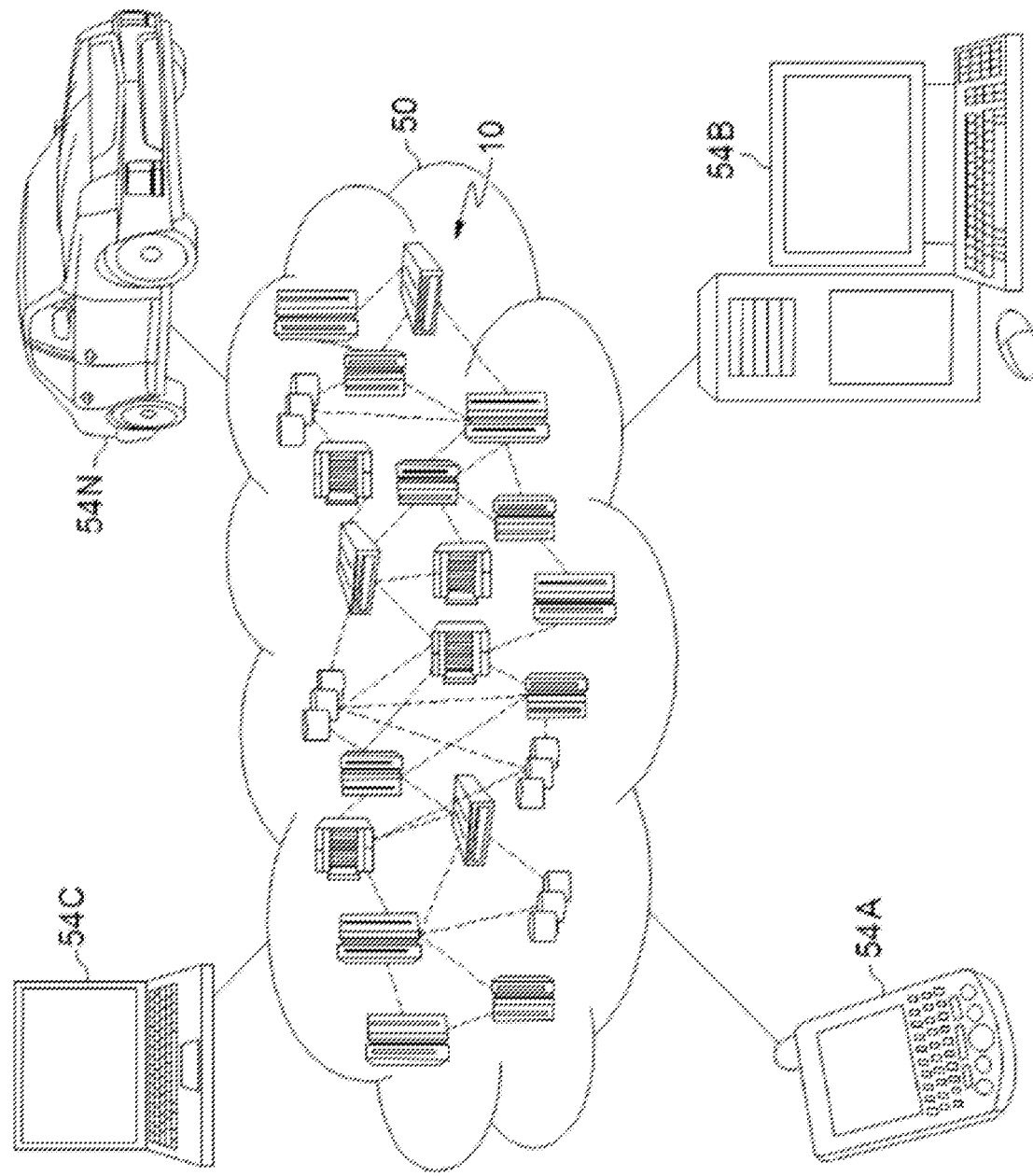
FIG. 6 depicts a cloud computing environment according to an embodiment of the present invention.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
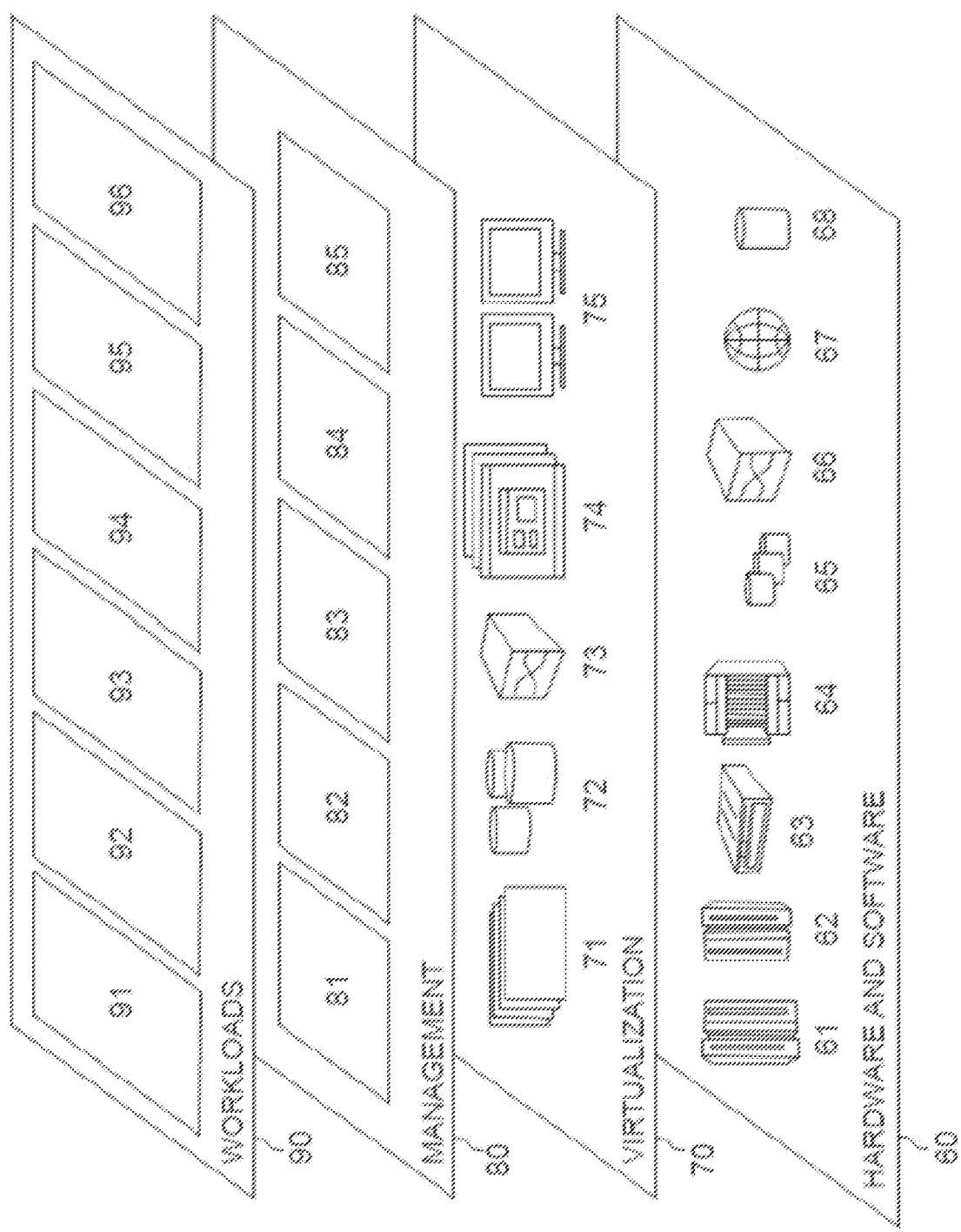
FIG. 7 depicts abstraction model layers according to an embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and secure biometrics matching 96.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the root terms "include" and/or "have", when used in this specification, specify the presence of stated features, integers, steps, operations, elements, and/or components, but do not preclude the presence or addition of at least one other feature, integer, step, operation, element, component, and/or groups thereof.

The corresponding structures, materials, acts, and equivalents of all means plus function elements in the claims below are intended to include any structure, or material, for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
receiving a first biometric input by an electronic device;
storing the first biometric input in the electronic device as a biometric profile;
sending the biometric profile to at least one server;
receiving an additional biometric input from a user by the electronic device;
comparing the additional biometric input to the biometric profile stored in the electronic device to generate a local matching score;
sending the additional biometric input to the at least one server;
comparing, via processing circuitry, the additional biometric input to the biometric profile stored in the at least one server to generate the remote matching score;
comparing the local matching score and a remote matching score generated by the at least one server;
determining whether to authenticate the user based on the comparison of the local matching score and the remote matching score;
comparing, via the processing circuitry, the local matching score of the first user to a matching score of a second user, wherein the matching score of the second user is different from the remote matching score of the first user; and
determining that the electronic device is compromised when the local matching score of the first user is within a threshold degree of similarity with the matching score of the second user,
wherein the second user is a different person than the first user.

2. The method according to claim 1, wherein said determining whether to authenticate the user includes authenticating the user when the local matching score matches the remote matching score.

3. The method according to claim 1, wherein said determining whether to authenticate the user includes denying the user when the local matching score does not match the remote matching score.

4. The method according to claim 1, further comprising determining at least one of whether an integrity of the electronic device is compromised or whether an integrity of the at least one server is compromised, based on said comparing of the local matching score and the remote matching score.

5. A device comprising:
processing circuitry configured to receive a first biometric input by an electronic device,
store the first biometric input in the electronic device as a biometric profile, send the biometric profile to at least one server,
receive an additional biometric input from a user by the electronic device, compare the additional biometric input to the biometric profile stored in the electronic device to generate a local matching score,
send the additional biometric input to the at least one server,
compare the additional biometric input to the biometric profile stored in the at least one server to generate the remote matching score,
compare the local matching score and a remote matching score generated by the at least one server, and
determine whether to authenticate the user based on the comparison of the local matching score and the remote matching score,
compare the local matching score of the first user to a matching score of a second user, wherein the matching score of the second user is different from the remote matching score of the first user, and
determine that the electronic device is compromised when the local matching score of the first user is within a threshold degree of similarity with the matching score of the second user,
wherein the second user is a different person than the first user.

6. The device according to claim 5, wherein said determining whether to authenticate the user includes denying the user when the remote matching score does not match the local matching score.

7. The device according to claim 5, wherein the processing circuitry is further configured to determine at least one of whether an integrity of the electronic device is compromised or whether an integrity of the at least one server is compromised, based on said comparing of the remote matching score and the local matching score.

8. The method according to claim 5, wherein the processing circuitry is further configured to:
compare the remote matching score of the first user to a matching score of a second user, wherein the matching score of the second user is different from the local matching score of the first user, and
determine that the at least one server is compromised when the remote matching score of the first user is within a threshold degree of similarity with the matching score of the second user,
wherein the second user is a different person than the first user.

9. A non-transitory computer-readable medium storing computer-readable instructions thereon which when executed by a computer cause the computer to perform a method comprising:
receiving a first biometric input by an electronic device;
storing the first biometric input in the electronic device as a biometric profile; sending the biometric profile to at least one server;
receiving an additional biometric input from a user by the electronic device; comparing the additional biometric input to the biometric profile stored in the electronic device to generate a local matching score;
sending the additional biometric input to the at least one server;

comparing the local matching score and a remote matching score generated by the at least one server;

determining whether to authenticate the user based on the comparison of the local matching score and the remote matching score;

comparing the local matching score of the first user to a matching score of a second user, wherein the matching score of the second user is different from the remote matching score of the first user; and determining that the electronic device is compromised when the local matching score of the first user is within a threshold degree of similarity with the matching score of the second user, wherein the second user is a different person than the first user.

10. The method according to claim 1, further comprising:

comparing the local matching score and the remote matching score to generate a third matching score; and authenticating a user when the third matching score is above a threshold.

11. The method according to claim 1, wherein said comparing comprises comparing the biometric input to all biometric profiles stored in the at least one server, wherein the highest matching score is used as the remote matching score.

12. The method according to claim 1, further comprising receiving the first biometric input by an iris scanner.

13. The method according to claim 1, wherein a difference between the local matching score and the remote matching score indicates version misalignment between the electronic device and the at least one server.

14. The method according to claim 1, wherein the electronic device comprises a smartphone.

15. The method according to claim 1, further comprising:

comparing the local matching score and the remote matching score to generate a third matching score; and authenticating a user when the third matching score is above a threshold, wherein said comparing comprises comparing the biometric input to all biometric profiles stored in the at least one server, wherein the highest matching score is used as the remote matching score, wherein a difference between the local matching score and the remote matching score indicates version misalignment between the electronic device and the at least one servers.

* * * * *